(12) United States Patent
Sonobe et al.

(10) Patent No.: US 11,951,520 B2
(45) Date of Patent: Apr. 9, 2024

(54) BLANK AND COMPONENT

(71) Applicant: NIPPON STEEL CORPORATION, Tokyo (JP)

(72) Inventors: Soma Sonobe, Tokyo (JP); Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 255 days.

(21) Appl. No.: 17/601,626

(22) PCT Filed: Apr. 9, 2020

(86) PCT No.: PCT/JP2020/015911
§ 371 (c)(1),
(2) Date: Oct. 5, 2021

(87) PCT Pub. No.: WO2020/209319
PCT Pub. Date: Oct. 15, 2020

(65) Prior Publication Data
US 2022/0193742 A1    Jun. 23, 2022

(30) Foreign Application Priority Data
Apr. 10, 2019 (JP) .................... 2019-074618

(51) Int. Cl.
*B21C 37/02* (2006.01)
*B21C 37/15* (2006.01)
*B21D 22/20* (2006.01)
*B21D 53/88* (2006.01)
*B60N 2/68* (2006.01)

(52) U.S. Cl.
CPC .............. *B21C 37/02* (2013.01); *B21C 37/15* (2013.01); *B21D 22/20* (2013.01); *B21D 53/88* (2013.01); *B60N 2/68* (2013.01)

(58) Field of Classification Search
CPC ...................................... B21C 37/02
See application file for complete search history.

(56) References Cited

U.S. PATENT DOCUMENTS

2011/0303330 A1  12/2011  Ichikawa
2013/0316187 A1  11/2013  Gross et al.

FOREIGN PATENT DOCUMENTS

| CN | 102284638 A | 12/2011 |
| DE | 103 30 161 A1 | 6/2005 |
| JP | 6-226479 A | 8/1994 |
| JP | 2009-242907 A | 10/2009 |
| JP | 2011-31273 A | 2/2011 |
| JP | 2011-68979 A | 4/2011 |
| JP | 2014-24080 A | 2/2014 |
| WO | WO 2012/059233 A1 | 5/2012 |

*Primary Examiner* — Adam Krupicka
(74) *Attorney, Agent, or Firm* — Birch, Stewart, Kolasch & Birch, LLP (57) ABSTRACT

Provided is a blank made of a steel and comprising at least two protruding regions (313) having an outer edge (311) protruding outward in in-plane directions, in which a softened part (320) is formed at least partially in the protruding regions (313) and the softened part (320) is formed in at least a part of the outer edge of the protruding regions (313), a Vickers hardness of the softened part (320) is lower than a Vickers hardness of a main portion region (310), and the blank comprises at least two of the protruding regions (313) having the softened part (320).

6 Claims, 10 Drawing Sheets

BLANK AND COMPONENT

TECHNICAL FIELD

The present invention relates to a blank and a component.

Priority is claimed on Japanese Patent Application No. 2019-074618, filed Apr. 10, 2019, the content of which is incorporated herein by reference.

BACKGROUND ART

When a blank is processed to form a formed product having a prescribed shape, the blank may be subjected to various treatments to adjust the properties and the functions of the blank in some cases.

Patent Document 1 discloses a technique for ensuring the ductility of a stretched flange portion by performing partial irradiation of a laser and softening when a weld line is disposed in a region having a concave shape which is a stretched flange portion after forming, in a composite blank.

Also, Patent Document 2 discloses a technique for partially softening a region which is a ridgeline portion in a member having a hat-shaped cross section after forming in a blank.

CITATION LIST

Patent Documents

[Patent Document 1]
Japanese Unexamined Patent Application, First Publication No. H06-226479
[Patent Document 2]
Japanese Unexamined Patent Application, First Publication No. 2011-068979

SUMMARY OF THE INVENTION

Problems to be Solved by the Invention

However, in all of the above documents, problems in a shrinkage flange portion formed through compression deformation are not considered. The technique described in Patent Document 1 is for ensuring the ductility of the stretched flange portion formed through tensile deformation due to partial softening and problems in the shrinkage flange portion formed through compression deformation are not considered.

Also, the technique described in Patent Document 2 is also for improving the bendability of the ridgeline portion having a hat-shaped cross section after forming through partial softening and problems in the shrinkage flange portion are not considered. Particularly, in the techniques described in Patent Documents 1 and 2, an influence of wrinkles produced in the shrinkage flange portion is not considered.

The present invention was made in view of the above problems, and an object of the present invention is to provide a new and improved blank capable of minimizing an influence of wrinkles produced in a shrinkage flange portion or the like.

Means for Solving the Problem (1) According to an aspect of the present invention, a blank made of a steel and including at least two protruding regions having an outer edge protruding outward in in-plane directions, in which a softened part is formed at least partially in the protruding regions and the softened part is formed in at least a part of the outer edge of the protruding regions, a Vickers hardness of the softened part is lower than a Vickers hardness of a main portion region, and the blank comprises at least two of the protruding regions having the softened part.

(2) In the blank of the above (1), in the protruding region having the softened part formed therein, a radius of curvature R of an outer edge of the protruding region may be 150 mm or less, and an opening angle of the outer edge may be 120° or less.

(3) In the blank of the above (1) or (2), a tensile strength of the main portion region of the blank may be 1100 MPa or more.

(4) In the blank of any one of the above (1) to (3), a tensile strength of the softened part may be 1000 MPa or less.

(5) In the blank of any one of the above (1) to (4), a ratio of the Vickers hardness of the softened part to the Vickers hardness of the main portion region of the blank may be 0.4 or more and 0.9 or less.

(6) According to another aspect of the present invention, a component made of a steel and including: a bottom surface portion; a first vertical wall portion and a second vertical wall portion which stand upright from an end portion of the bottom surface portion; and at least two corner portions provided between the first vertical wall portion and the second vertical wall portion, in which a softened part is formed at least partially in the corner portion, a Vickers hardness of the softened part is lower than a Vickers hardness of a main portion region of the component, and the component includes at least two of the corner portions having the softened part.

(7) In the component of the above (6), a tensile strength of the main portion region of the component may be 1100 MPa or more.

(8) In the component of the above (6) or (7), a tensile strength of the softened part may be 1000 MPa or less.

(9) In the component of any one of the above (6) to (8), a ratio of the Vickers hardness of the softened part to the Vickers hardness of the component may be 0.4 or more and 0.9 or less.

(10) In the component of any one of the above (6) to (9), the corner portion may include a shrinkage flange portion.

Effects of the Invention

According to the present invention, a new and improved blank capable of minimizing an influence of wrinkles produced in a shrinkage flange portion or the like is provided.

EMBODIMENTS FOR IMPLEMENTING THE INVENTION

Preferred embodiments of the present invention will be described in detail below with reference to the accompanying drawings. In the specification and the drawings, constituent elements having substantially the same functional constitution are denoted by the same reference numerals and duplicate description thereof will be omitted.

1. First Embodiment

[Schematic Configuration of Steel Sheet]

Figure 1A:
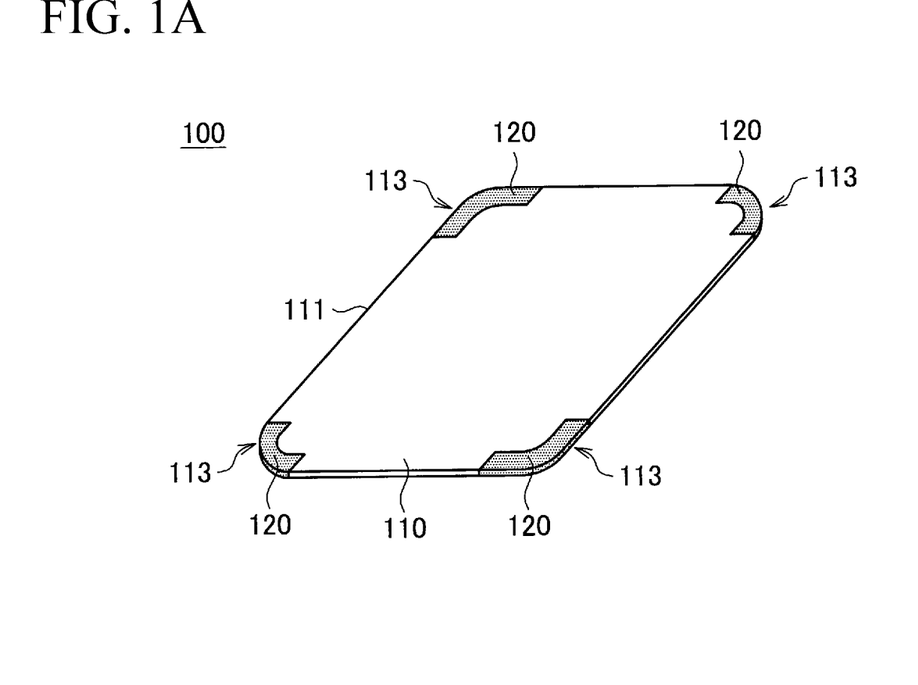
FIG. 1A is a perspective view showing an example of a blank according to a first embodiment of the present invention.
Figure 1B:
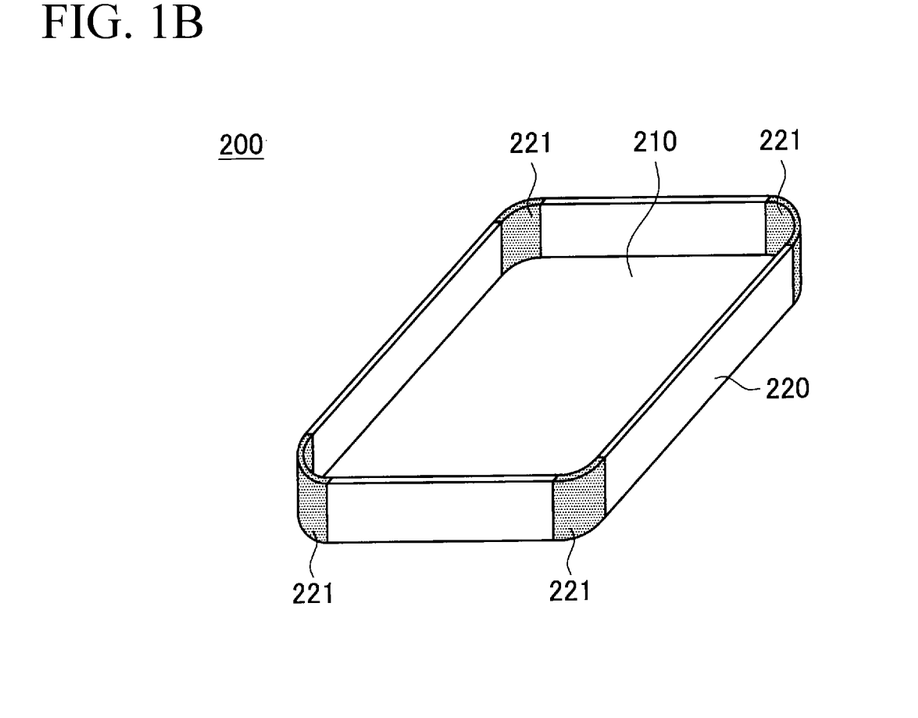
FIG. 1B is a perspective view showing an example of a formed product according to the embodiment.

First, a schematic configuration of a blank 100 according to a first embodiment of the present invention will be described with reference to FIGS. 1A and 1B. FIG. 1A is a perspective view showing an example of the blank 100 according to the embodiment. FIG. 1B is a perspective view showing an example of a formed product 200 according to the embodiment. The blank 100 according to the embodiment is a material to be processed which is subjected to various processing so that the material to be processed is finally processed into a formed product having a prescribed shape. The blank 100 is formed to have a prescribed sheet shape through cutting processing from, for example, a steel sheet which is a flat sheet-shaped member. Examples of the cutting processing include known cutting processing techniques such as punching press processing and laser processing and are not particularly limited.

The blank 100 cut out from the steel sheet is processed into a formed product having a prescribed shape through, for example, cold forming. Although the details of a shape of the blank 100 which has been subjected to the processing will be described later, the blank 100 is processed to have a shape in which the blank 100 has a shrinkage flange portion (corresponding to a shrinkage flange portion 221 in FIG. 1B which will be described later) through cold forming. Examples of the cold forming include known cold forming techniques such as press bending processing and press drawing processing and are not particularly limited.

As shown in FIG. 1A, the blank 100 has a main portion region 110 and protruding regions 113. The main portion region 110 is a region mainly constituting the blank 100 and has the same properties as the steel sheet from which the blank 100 is cut out. The main portion region 110 may be a steel having a tensile strength of 1100 MPa or more. Furthermore, the main portion region 110 may be a steel having a tensile strength of 1100 MPa or more and 2000 MPa or less.

The protruding regions 113 are regions in which a part of an outer edge 111 in the blank 100 protrudes outward when viewed in a plan view substantially perpendicular to the sheet surface of the blank 100, that is, in in-plane directions of the blank 100. Furthermore, the protruding regions 113 are regions which are shrinkage flange portions after forming. In other words, at least a part of the formed protruding regions 113 constitute at least a part of the shrinkage flange portion. Softened parts 120 are formed at least partially in the protruding regions 113. Details of the softened parts 120 will be described later. The blank 100 may have two or more protruding regions 113 having the softened parts 120 formed therein.

[Shape of Formed Product and Problems During Forming]

A shape of the formed product 200 and problems during forming will be described below with reference to FIG. 1B. The blank 100 having a prescribed shape is formed into the formed product 200 having a prescribed shape through, for example, cold forming. As shown in FIG. 1B, for example, the formed product 200 has a box shape and has a web portion 210 as a bottom surface, a flange portion 220 standing upright from the bottom surface, and the shrinkage flange portion 221. Here, the formed product 200 includes a finished product formed to have a prescribed shape by processing the blank 100 and a semi-finished product in which steps such as additional processing and treatments are required.

For example, the formed product 200 has the flange portion 220 formed by bending an outer circumferential side of the blank 100. The flange portion 220 has the shrinkage flange portion 221 deforming while a part thereof receives compressive stress during forming.

In such a formed product having the shrinkage flange portion 221, problems due to the shape thereof may arise in some cases. That is to say, due to the compressive stress during forming, a part of the blank 100 (the protruding regions 113) may deform in a wavy shape as a result of out-of-plane deformation during forming. When the deformed position is further crushed with a mold, after forming, wrinkles which are minute unevennesses occur. Wrinkles occurring in a formed product may cause deterioration of an appearance or dimensional accuracy of the formed product or deterioration of welding quality.

Particularly, when a high-strength steel sheet is used as a base steel sheet of the blank 100, formability is reduced, since such a steel has a high yield stress and an inferior ductility. Furthermore, since high-strength steel sheets may be used for the purpose of weight reduction in many cases and are thinned, surface rigidity is reduced as a steel sheet. Due to these causes, when the formed product 200 having the shrinkage flange portion 221 is formed using the blank 100 of a high-strength steel sheet, wrinkles after forming are likely to occur on the shrinkage flange portion 221 and a height of wrinkles and an amount of increase in thickness of wrinkles also increase. As a result, the appearance and the dimensional accuracy of the formed product 200 easily deteriorate and the welding quality thereof easily deteriorates. Particularly, when the base steel sheet of the blank 100 is a steel having a tensile strength of 1100 MPa or more, an influence of the occurrence of wrinkles increases.

Thus, as a result of diligent studies, the inventors of the present invention have conceived the idea of forming the softened parts 120 in the protruding regions 113 of the blank 100 corresponding to the shrinkage flange portion 221 of the formed product 200. That is to say, the inventors of the present invention have come up with the idea of forming the softened parts 120 in the protruding regions 113 to reduce a yield point of a region which is the shrinkage flange portion 221, minimize out-of-plane deformation during forming, and minimize the occurrence of wrinkles in the shrinkage flange portion 221.

Due to the forming process described above, the Vickers hardness of a shrinkage flange portion differs in a ridgeline direction. Furthermore, a difference occurs in a sheet thickness of the shrinkage flange portion in the ridgeline direction. In this respect, the shrinkage flange portion is different from, for example, a bent part in a formed product obtained by bending a sheet material in an out-of-plane direction. The ridgeline direction of the flange portion can be also referred to as a direction parallel to a line of intersection of virtual planes in which sheet surfaces of two flange portions adjacent to the shrinkage flange portion expand.

For example, in the shrinkage flange portion 221 of the formed product 200 illustrated in FIG. 1B, the Vickers hardness of the shrinkage flange portion 221 increases and the sheet thickness of the shrinkage flange portion 221 further increases as a distance from the web portion 210 increases in the ridgeline direction of the shrinkage flange portion 221.

[Softened Part]

The softened parts 120 are softened regions formed at least partially in the protruding regions 113 of the blank 100. The Vickers hardness of the softened parts 120 is set lower than the Vickers hardness of the main portion region 110 of the blank 100. Particularly, the Vickers hardness of the softened parts 120 may be set to be 0.4 or more and 0.9 or less as a proportion with respect to the Vickers hardness of the main portion region 110 of the blank 100.

When the Vickers hardness of the softened parts 120 is set to 0.9 or less of the Vickers hardness of the main portion region 110, the effect of minimizing the occurrence of wrinkles in the shrinkage flange portion 221 of the formed product can be obtained by partially reducing the yield point of the protruding regions 113. On the other hand, it is possible to maintain a sufficient strength of the formed product by setting the Vickers hardness of the softened parts 120 to 0.4 or more with respect to the Vickers hardness of the main portion region 110.

The hardness measurement conditions are as follows. A sample including the protruding regions 113 of the blank 100 is collected, a sample of a measurement surface is prepared, and the sample is subjected to a Vickers hardness test. A method for preparing a measurement surface is performed conforming to JIS Z 2244:2009. After the measurement surface is polished using #600 to #1500 silicon carbide paper, the measurement surface is mirror-finished using a liquid obtained by dispersing a diamond powder having a particle size of 1 μm to 6 μm in a diluting solution such as alcohol and pure water. The Vickers hardness test is performed in accordance with the method described in JIS Z 2244: 2009. The Vickers hardness of a sample having a measurement surface prepared thereon is measured using a micro Vickers hardness tester with a test load of 1 kgf (9.8 N). For example, positions in which the Vickers hardness is 0.9 or less with respect to an average value of the Vickers hardness at a plurality of positions on a central portion of the main portion region 110 may be set as the softened parts 120.

Also, the softened parts 120 may be set so that the tensile strength is 1000 MPa or less. Thus, the strength of the softened parts 120 is minimized and the occurrence of wrinkles is further minimized.

Examples of the method for forming each of the softened parts 120 include a method for softening the blank 100 by partially tempering the blank 100 using a known partial heating technique such as laser heating or high frequency heating. Furthermore, as another example, the blank 100 may be softened by partially tempering the blank 100 through a hot forming technique such as partial hot forming. The method for forming the softened part 120 may be any method as long as the hardness can be partially reduced and may be a method other than tempering with heating. For example, the method may be a method such as partially decarburizing the blank 100.

The softened parts 120 may not be formed in all of the protruding regions 113 included in the blank 100. The softened parts 120 may be formed in the protruding regions 113 in which the occurrence of wrinkles is predicted in consideration of the shape, the size, and the like of the shrinkage flange portion 221 after forming.

The softened parts 120 may be formed in a region including the outer edge 111 of the protruding regions 113. In other words, the softened parts 120 may be formed in at least a part of the outer edge 111 of the protruding regions 113. When the softened parts 120 are formed in the region including the outer edge 111 of the protruding regions 113, the vicinity of the outer edge 111 in which wrinkles easily occur is softened and the occurrence of wrinkles can be further minimized.

Also, the softened parts 120 may expand in the protruding regions 113 in the in-plane directions (a direction orthogonal to a sheet thickness direction) of the blank 100. To be specific, the softened part 120 includes the outer edge 111, may be formed in the in-plane directions over a distance from the outer edge 111 of 60 mm, and preferably may be formed over a distance from the outer edge 111 of 40 mm.

When the softened parts 120 expand in the in-plane directions, softened regions in the protruding regions 113 are sufficiently secured and the occurrence of wrinkles in the shrinkage flange portion 221 is further minimized. Furthermore, when the softened parts 120 are formed in the in-plane directions from the outer edge 111 within a prescribed range, high strength in a formed product can be maintained while a softened region is secured. In addition, the softened parts 120 may be formed only in the protruding regions 113 or may be formed up to the main portion region 110 as long as the softened parts 120 are within a range of 50 mm outward from the protruding regions 113.

In the case of press working (drawing forming, bending forming) in which the movement of the blank 100 can occur when the blank 100 is processed to have a prescribed shape, a formation range of the softened parts 120 may be determined in consideration of an amount corresponding to the movement of the blank 100 during forming. Furthermore, a depth of the softened parts 120 in the sheet thickness direction is not particularly limited and the softened parts 120 may be formed in the sheet thickness direction.

Also, the softened parts 120 may be formed of a separate member made of a different material from the main portion region 110 of the blank 100. For example, the Vickers hardness of the separate member may be set lower than the Vickers hardness of the main portion region 110 of the blank 100 and the separate member may be attached to the blank 100 through welding or the like to form the softened part 120. In this case, the separate member has a protruding shape and is the shrinkage flange portion 221 after forming the blank 100.

According to the embodiment, when the softened parts 120 are formed in the protruding regions 113, the yield point of the region which is the shrinkage flange portion 221 is reduced and the out-of-plane deformation during forming is minimized. That is to say, when the softened parts 120 are formed, plastic deformation of the protruding regions 113 easily occurs and the protruding regions 113 and the mold fit each other at an early stage after the start of forming. As a result, the out-of-plane deformation of the shrinkage flange portion 221 is minimized. Therefore, as a result of minimizing the occurrence of wrinkles on the shrinkage flange portion 221 of the formed product 200, the influence of wrinkles on the formed product 200 is reduced. Particularly, deterioration of an appearance or dimensional accuracy of the shrinkage flange portion 221 of the formed product 200 is reduced.

2. Second Embodiment

A blank 300 according to a second embodiment of the present invention will be described below. The blank 300 according to the present embodiment is different from that of the first embodiment in that the blank is formed on a seat cushion frame by forming. Description of constituent elements in the description of the present embodiment that are the same as those of the first embodiment will be omitted.

Figure 2A:
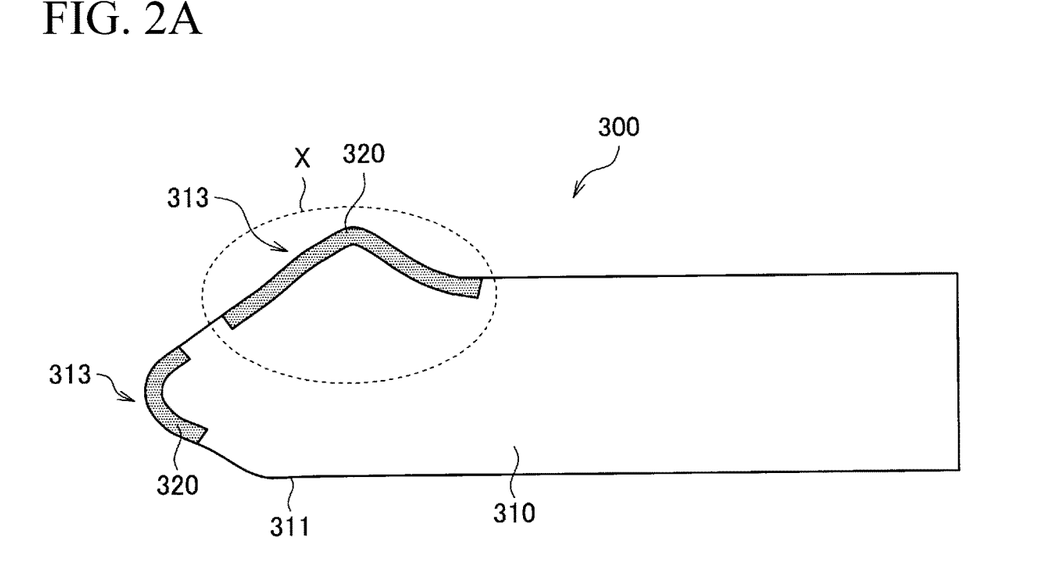
FIG. 2A is a plan view showing an example of a blank according to a second embodiment of the present invention.
Figure 2B:
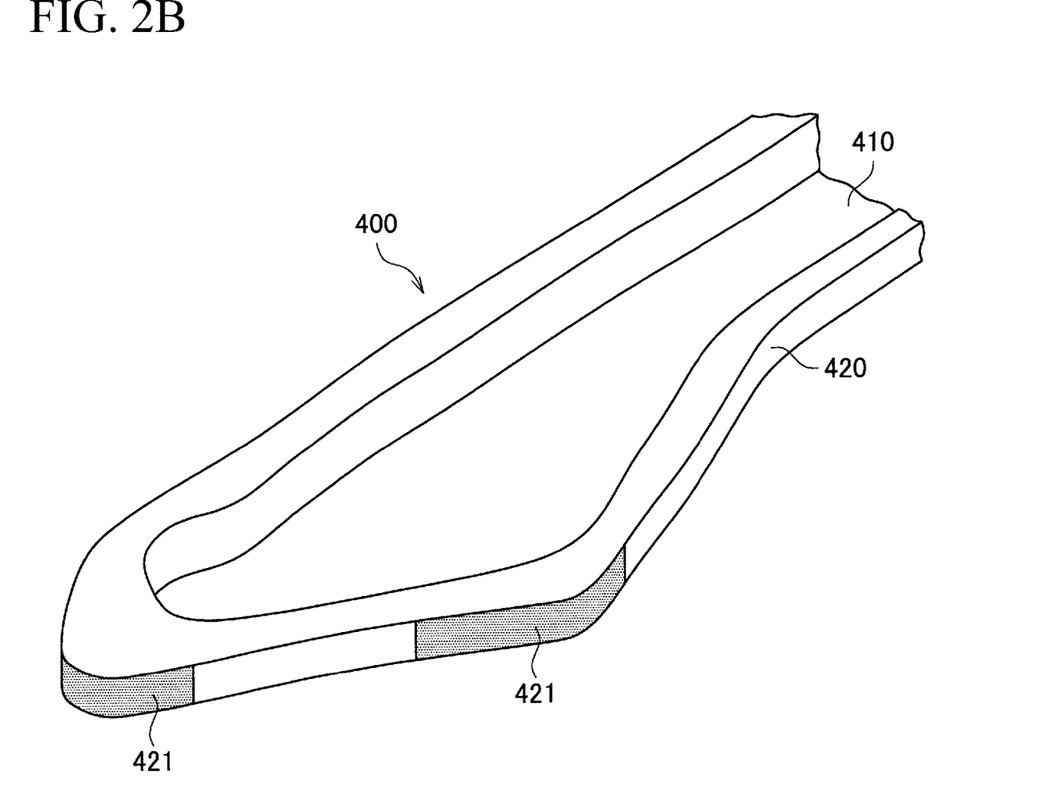
FIG. 2B is a perspective view showing an example of a seat cushion frame according to the embodiment.

The blank 300 and a seat cushion frame 400 according to the present embodiment will be described with reference to FIGS. 2A and 2B. FIG. 2A is a plan view showing an example of the blank 300 according to the present embodiment. FIG. 2B is a perspective view showing an example of the seat cushion frame 400 according to the present embodiment.

The blank 300 cut out from a steel sheet is further processed into the seat cushion frame 400 (a side frame) which is a formed product having a prescribed shape by cold forming. To be specific, the blank 300 is processed to have a shape having a shrinkage flange portion (corresponding to a shrinkage flange portion 421 in FIG. 2B which will be described later) by cold forming such as press bending processing and press drawing processing. The seat cushion frame 400 is a part of a seat frame which is an internal skeleton of a vehicle seat and is a member provided on a side of a seat cushion which supports the thighs or the buttocks of a seat occupant.

As shown in FIG. 2A, the blank 300 has a main portion region 310 and protruding regions 313. Each of the protruding regions 313 is a region in which a part of an outer edge 311 of the blank 300 protrudes outward when viewed in a plan view substantially perpendicular to the sheet surface of the blank 300, that is, in an in-plane direction of the blank 300. Furthermore, the protruding region 313 is a region which is a shrinkage flange portion after forming. In other words, at least a part of the formed protruding region 313 constitutes at least a part of the shrinkage flange portion. Softened parts 320 are formed in the protruding regions 313.

As shown in FIG. 2B, the seat cushion frame 400 has a frame main body part 410 and a frame flange portion 420 standing upright from an end portion of the frame main body part 410. The frame flange portion 420 has the shrinkage flange portion 421. The seat cushion frame 400 can have various shapes in accordance with a structure of the seat frame.

As an example, the seat cushion frame 400 has the frame flange portion 420 formed by bending an outer circumferential side of the blank 300. When the protruding regions 313 of the blank 300 deform while receiving compressive stress during forming, the shrinkage flange portion 421 is formed on the frame flange portion 420. As described above, wrinkles may also occur in the shrinkage flange portion 421 of the seat cushion frame 400 in some cases.

As shown in FIG. 2A, the plurality of protruding regions 313 can be formed on the blank 300. Furthermore, the protruding regions 313 can have various protruding shapes in consideration of a shape of the seat cushion frame 400 after forming. The protruding regions 313 according to the present embodiment will be described below with reference to FIG. 3.

Figure 3:
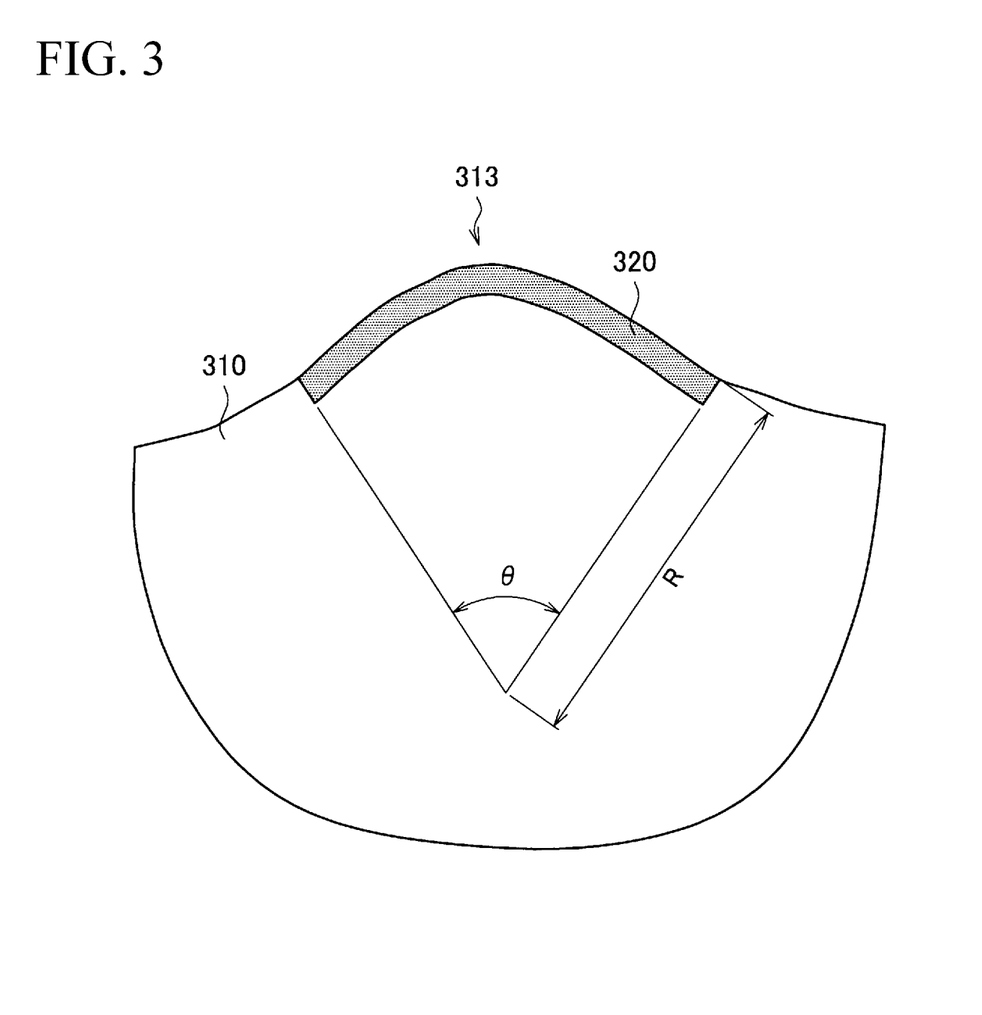
FIG. 3 is a cross-sectional view showing protruding regions according to the second embodiment of the present invention.

FIG. 3 is a diagram for explaining the protruding regions 313 of the blank 300 and is an enlarged diagram of a region X in FIG. 2A. As shown in FIG. 3, the protruding region 313 is a region in which a part of the outer edge 311 of the blank 300 protrudes outward. The protruding region 313 is determined with a known circulation method from the setting of a circular arc parallel to the sheet surface of the blank 300 in the outer edge 311 of the blank 300 and from a radius of curvature and an opening angle of the circular arc. The circular arc is a circular arc connecting three points separated by a pitch of 1 mm along the outer edge 311. As shown in FIG. 3, a radius of curvature R of a circular arc for determining the protruding region 313 is 150 mm or less and an opening angle θ is 60 degrees or more and 120 degrees or less. Through the above method, the protruding regions 313 are determined and the softened parts 320 are formed in the protruding regions 313.

As described above, when the protruding regions 313 are specifically identified and the softened parts 320 are formed in the protruding regions 313, it is possible to provide the softened parts 320 in the protruding regions 313 in which wrinkles are assumed to occur. Thus, it is possible to effectively minimize the occurrence of wrinkles in the shrinkage flange portion 421 of the seat cushion frame 400 and maintain a high strength of the seat cushion frame 400 after forming.

The blank 300 may have two or more protruding regions 313 having the softened parts 320 formed therein. Furthermore, the main portion region 310 of the blank 300 may be a steel having a tensile strength of 1100 MPa or more. In addition, the main portion region 310 of the blank 300 may be a steel having a tensile strength of 1100 MPa or more and 2000 MPa or less.

According to the present embodiment, when the softened parts 320 are formed in the protruding regions 313, the yield point of the region which is the shrinkage flange portion 421 is reduced and out-of-plane deformation during forming is minimized. As a result, in the seat cushion frame 400 which is a formed product, the occurrence of wrinkles in the shrinkage flange portion 421 is minimized. Thus, it is possible to reduce an influence of wrinkles on the seat cushion frame 400. Particularly, deterioration of an appearance or dimensional accuracy of the shrinkage flange portion 421 of the seat cushion frame 400 is reduced.

Although an example in which the blank 300 is formed in the seat cushion frame 400 has been described in the present embodiment, a seat cushion frame may be used as long as the seat cushion frame is a formed product having a shrinkage flange portion and the present invention is not limited to the seat cushion frame. For example, the present invention may be applied to a seat back frame.

Figure 4:
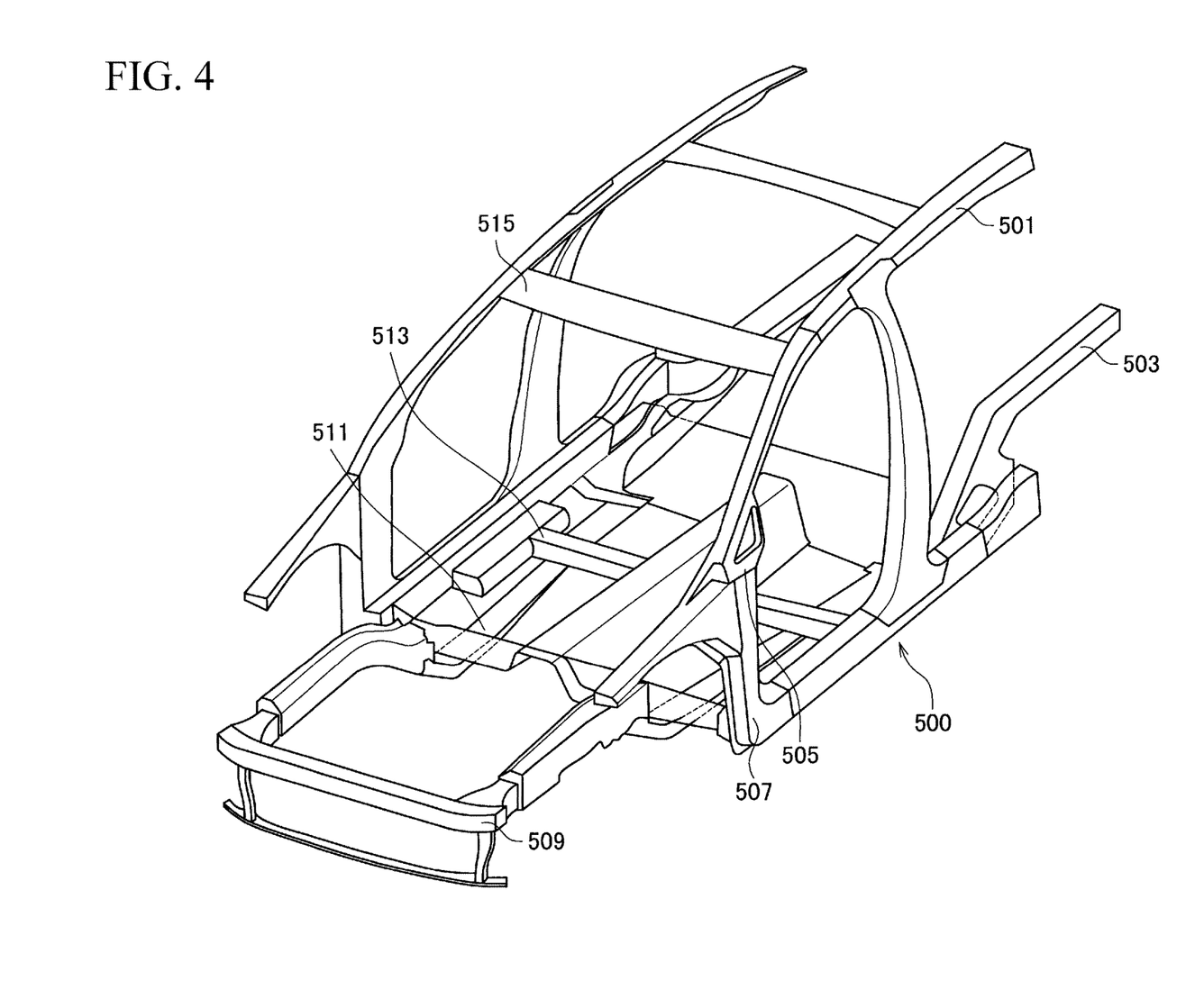
FIG. 4 shows an automobile skeleton as an example to which a skeleton member formed using a blank according to any embodiment of the present invention is applied.

Application Example of Skeleton Member According to Embodiment of Present Invention The preferred embodiments of the present invention have been described in detail above. An application example of a skeleton member formed using the blank 100 or 300 according to any of the embodiments of the present invention will be described below with reference to FIG. 4. FIG. 4 is a diagram showing an automobile skeleton 500 as an example to which a skeleton member formed using the blank 100 or 300 according to the embodiment of the present invention is applied. The skeleton member formed using the blank 100 or 300 can constitute the automobile skeleton 500 as a cabin skeleton or a shock absorbing skeleton. Examples of application as the cabin skeleton include a roof side rail 501, an A pillar lower 507, an A pillar upper 505, a kick reinforce 511, a floor cross member 513, a front header 515, and the like.

Also, examples of application of the skeleton member as the shock absorbing skeleton include a rear side member 503, a bumper reinforce 509, and the like.

The skeleton member formed using the blank 100 or 300 according to any of the embodiments of the present invention minimizes the occurrence of wrinkles in the shrinkage flange portion. Thus, an influence of wrinkles is also reduced on the skeleton member.

Figure 5A:
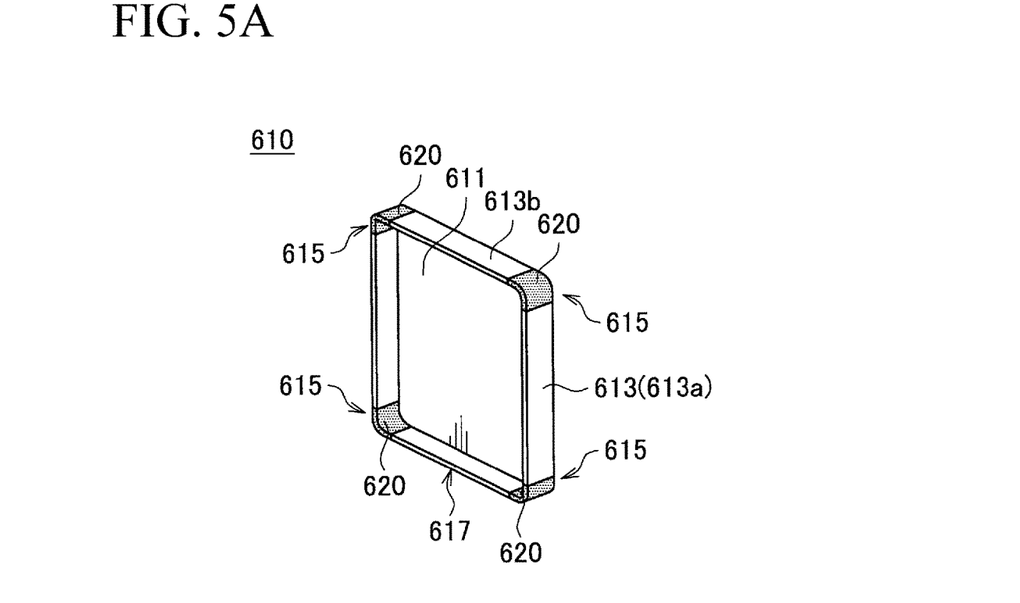
FIG. 5A shows an example of a component formed using a blank according to any embodiment of the present invention.
Figure 5B:
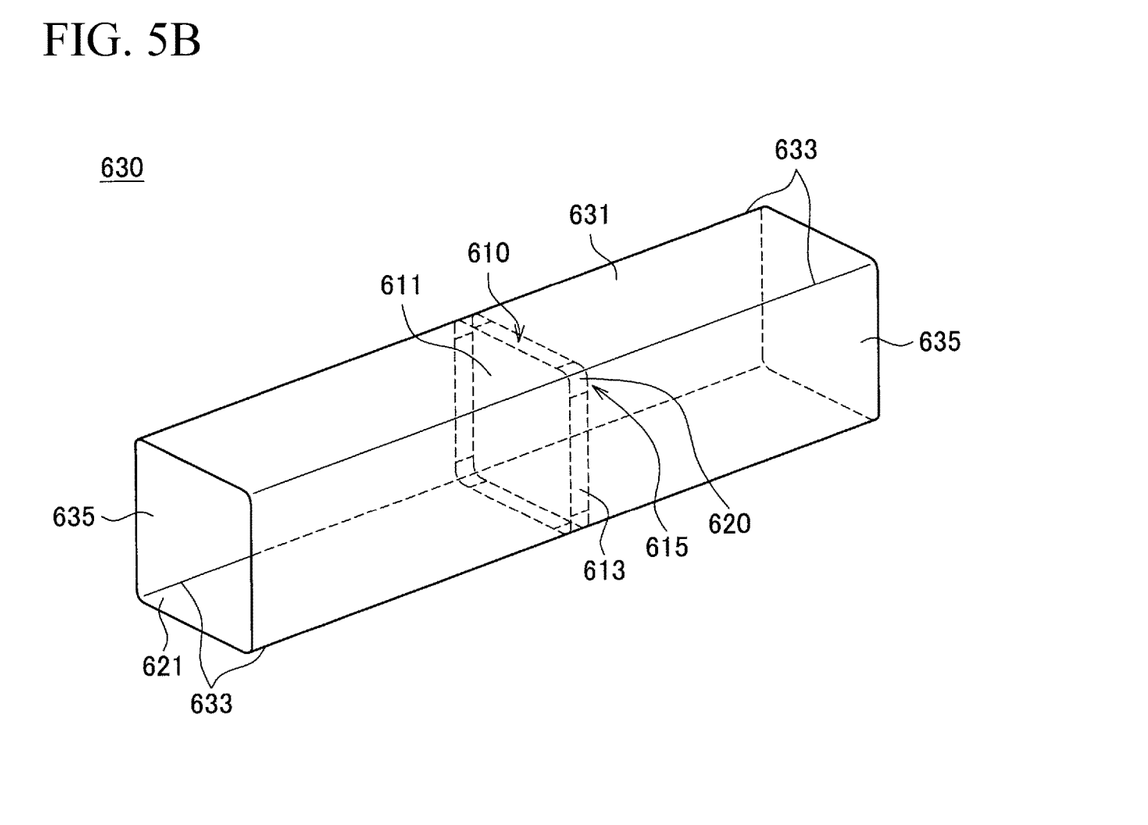
FIG. 5B shows an example to which a component formed using a blank according to any embodiment of the present invention is applied.

An example of a component formed using the blank 100 according to any of the embodiments of the present invention will be described below with reference to FIGS. 5A and 5B. FIG. 5A is a diagram showing an example of a component formed using the blank 100 according to the embodiment. Furthermore, FIG. 5B is a diagram showing an example in which a component formed using the blank 100 according to the embodiment is applied. Examples of the component formed using the blank 100 according to the embodiment include a bulkhead 610. The bulkhead 610 is a substantially box-shaped member in which one surface is open. When the bulkhead 610 forms a partition wall inside a hollow skeleton member, the rigidity and the collision performance of the skeleton member are further improved.

As shown in FIG. 5A, the bulkhead 610 as a component has a box shape as an example and has a web portion 611 as a bottom surface portion, a flange portion 613 as a vertical wall portion standing upright from an end portion of the bottom surface portion, and corner portions 615. Softened parts 620 are formed at least partially on the corner portions 615. Furthermore, the web portion 611 and the flange portion 613 are composed of a main portion region 617.

The flange portion 613 has a first flange portion 613a as a first vertical wall portion and a second flange portion 613b as a second vertical wall portion. Each of the corner portions 615 is provided between the first flange portion 613a and the second flange portion 613b so as to bend and connect the first flange portion 613a and the second flange portion 613b. The second flange portion 613b is provided in a direction substantially orthogonal to the first flange portion 613a from an end portion of the corner portion 615. Furthermore, one end of the corner portion 615 in a ridgeline direction is connected to the web portion 611.

As shown in FIG. 5A, at least two corner portions 615 are formed on the bulkhead 610. Furthermore, the bulkhead 610 has two or more corner portions 615 having the softened part 620 formed therein. A part of the corner portion 615 is formed as a part of the shrinkage flange portion described above.

The Vickers hardness of the softened part 620 is set lower than the Vickers hardness of the main portion region 617 constituting the web portion 611 or the flange portion 613 of the bulkhead 610. Particularly, the Vickers hardness of the softened part 620 may be set to 0.4 or more and 0.9 or less in proportion to the Vickers hardness of the main portion region 617 of the bulkhead 610.

When the Vickers hardness of the softened part 620 is set to 0.9 or less with respect to the Vickers hardness of the main portion region 617, it is possible to obtain the effect of minimizing breakage at the time of collision at the corner portion 615 of the formed product. Furthermore, when the Vickers hardness of the softened part 620 is set to 0.9 or less with respect to the Vickers hardness of the main portion region 617, it is also possible to obtain the effect of minimizing the occurrence of wrinkles. On the other hand, when the Vickers hardness of the softened part 620 is set to 0.4 or more with respect to the Vickers hardness of the main portion region, it is possible to sufficiently maintain the strength of the formed product.

The main portion region 617 of the bulkhead 610 may be a steel having a tensile strength of 1100 MPa or more. Furthermore, the softened parts 620 may be set to have a tensile strength of 1000 MPa or less.

The bulkhead 610 is provided inside the angular tubular skeleton member 630 in a short direction of the skeleton member 630. The skeleton member 630 has a pair of first wall portions 631, corner portions 633 provided on end portions of the first wall portions 631 in the short direction, and a pair of second wall portions 635 provided in a direction orthogonal to the first wall portions 631 from the corner portions 633. The flange portion 613 of the bulkhead 610 is attached to inner surface sides of the first wall portions 631 and the second wall portions 635. Furthermore, the corner portion 615 of the bulkhead 610 is attached to bent inner sides of the corner portions 633 of the skeleton member 630.

The bulkhead 610 is formed of the blank 100 according to the present embodiment and the softened parts 620 are provided in the corner portion 615 of the bulkhead 610. For this reason, when a load is input to the skeleton member 630, it is possible to prevent a breakage of the bulkhead 610 in which the corner portion 615 which is a shrinkage flange portion is a starting point.

Also, since the bulkhead 610 is formed of the blank 100 according to the present embodiment, the occurrence of wrinkles is minimized in the corner portion 615 which is a shrinkage flange portion. Thus, an influence of wrinkles on the bulkhead 610 is reduced, for example, the adhesion between the bulkhead 610 and the skeleton member 630 is improved.

EXAMPLES

Example 1

Figure 6A:
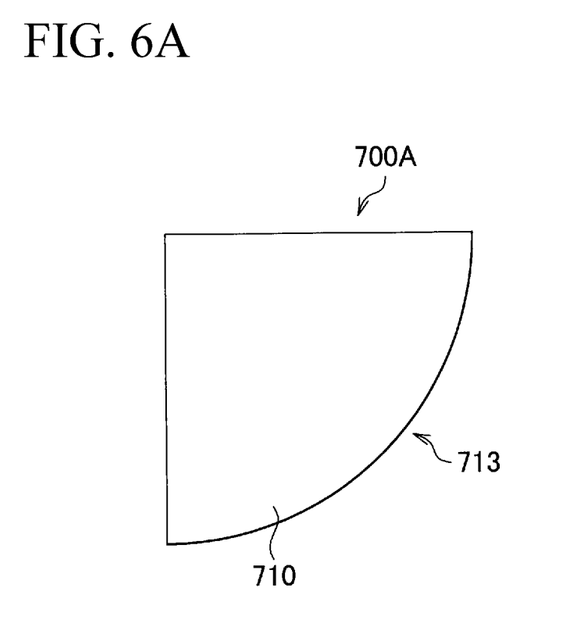
FIG. 6A shows a blank model used for simulation analysis as a comparative example.
Figure 6B:
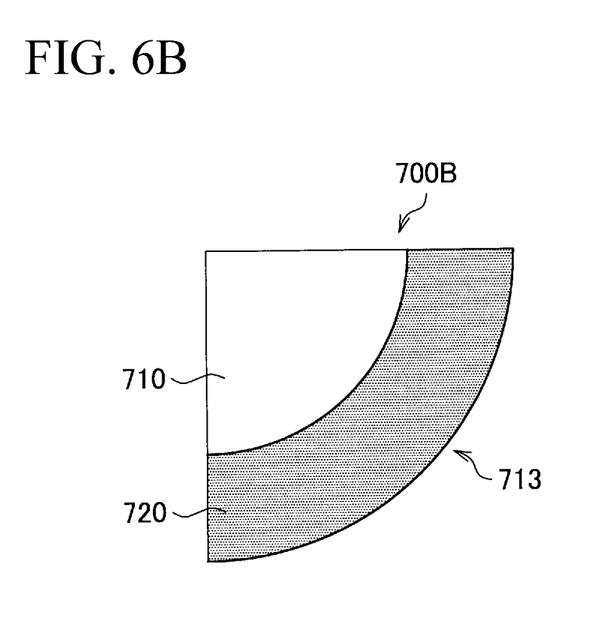
FIG. 6B shows a blank model used for simulation analysis as an example.
Figure 6C:
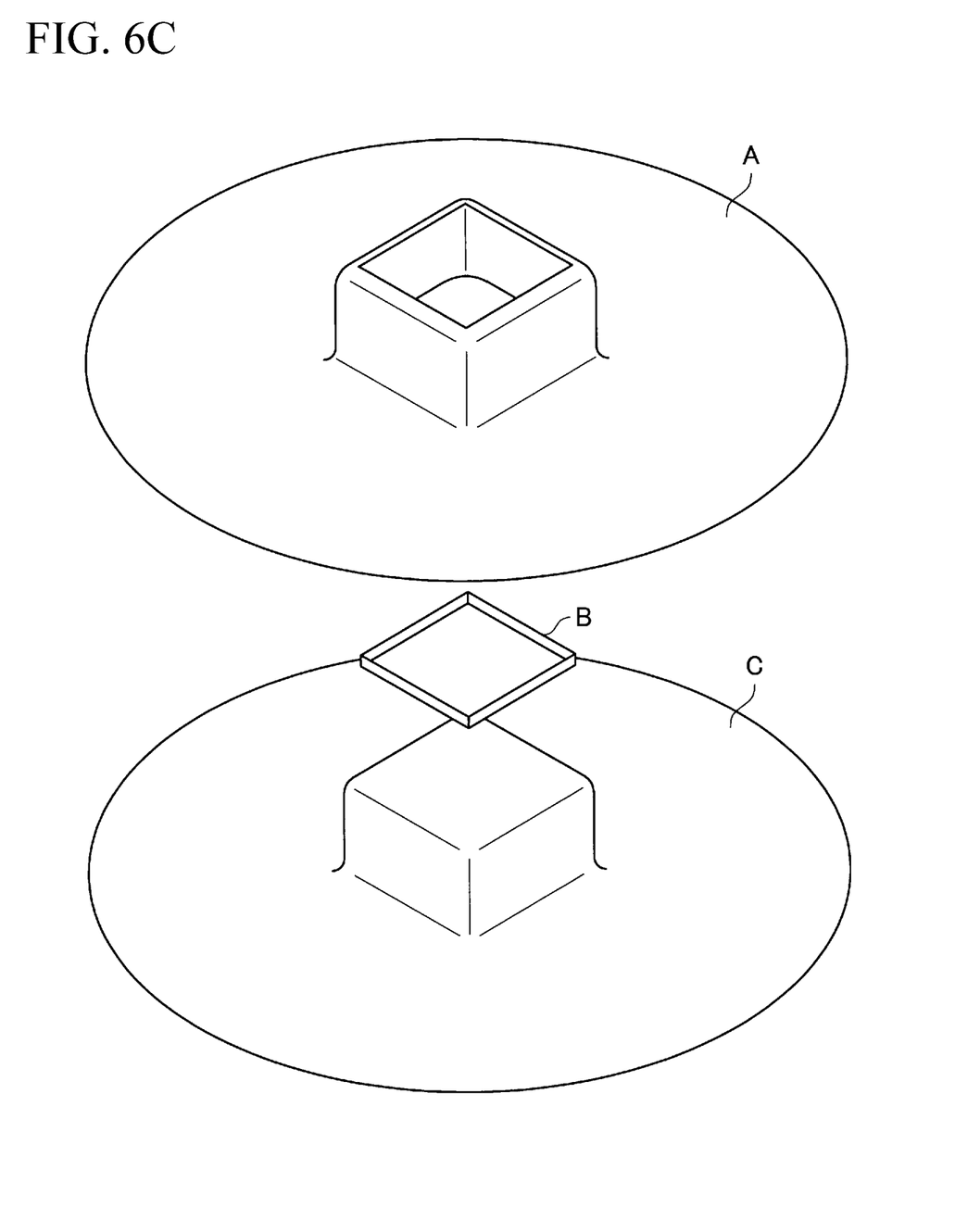
FIG. 6C shows an example of a press working form assumed in simulation analysis.
Figure 6D:
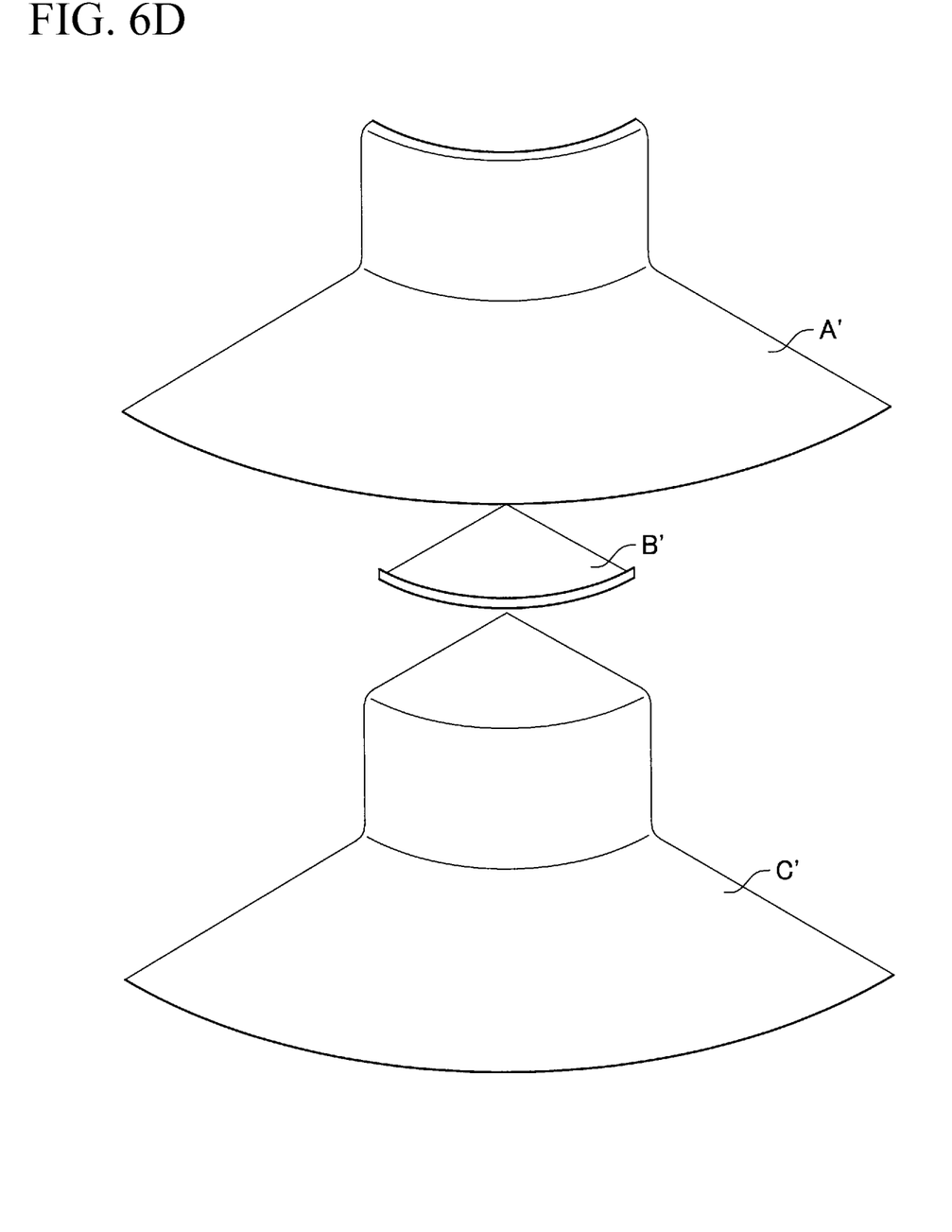
FIG. 6D shows a simple mold model in which a shrinkage flange portion of a mold model for press working assumed in simulation analysis is extracted.

In order to confirm an influence of the blank according to the above-described embodiment on the occurrence of wrinkles, simulation analysis of press forming was performed. The simulation analysis results will be described with reference to FIGS. 6A, 6B, 6C, and 6D. FIG. 6A is a blank model used in the simulation analysis as Comparative Example 1. FIG. 6B is a blank model used in simulation analysis as an example. FIG. 6C is a diagram showing an example of a mold for press working assumed in the simulation analysis. FIG. 6D is a simple mold model in which a corner portion which forms a shrinkage flange portion is extracted from the mold shown in FIG. 6C. This analysis was performed using the simple mold model shown in FIG. 6D.

As shown in FIG. 6A, in the comparative example to the present invention, a blank model 700A having a quadrant shape (corresponding to a protruding region) was used. In the comparative example, a region 710 corresponding to a steel having a tensile strength of 1180 MPa which is a base steel sheet is provided and a radius of curvature R of an outer edge 713 when viewed in a top view was 120 mm. On the other hand, as shown in FIG. 6B, in the example of the present invention, a quadrant-shaped blank model 700B was used as same as in the comparative example. In the example, a region 720 which is a softened part was provided on an outer circumferential side of the quadrant and the region 710 corresponding to a steel having a tensile strength of 1180 MPa which is a base steel sheet was further provided on a central side of the quadrant.

Also, in the example, the simulation was performed by changing the Vickers hardness of the region 720. In Example 1, the Vickers hardness of the region 720 corresponding to a softened part was set to 0.83 with respect to the Vickers hardness of the region 710. This corresponds to a case in which the softened part is a steel having a tensile strength of 980 MPa. In Example 2, the Vickers hardness of the region 720 was set to 0.66 with respect to the region 710. This corresponds to a case in which the softened part is a steel having a tensile strength of 780 MPa. In Example 3, the Vickers hardness of the region 720 was set to 0.5 with respect to the Vickers hardness of the region 710. This corresponds to a case in which the softened part is a steel having a tensile strength of 590 MPa. A radius of curvature R of the outer edge 713 of the model in the example when viewed in a top view is 120 mm as same as in Comparative Example 1. In addition, the region 720 corresponding to the softened part includes the outer edge 713 of the model and exists to a position 60 mm away from the outer edge 713 of the model. For this reason, the entire vertical wall is composed of the region 720. A sheet thickness of the model is the same in the example and Comparative Example 1.

As shown in FIG. 6D, the simulation of press working of a blank was performed using mold models A', B', and C'. The mold models A', B', and C' are simple models corresponding to parts of a die A, a pad B, a punch C in FIG. 6C respectively. The inventors of the present invention deformed the blank model by moving the blank model toward the mold model A' (the die) while holding the central side using the mold model C' (the punch) and the mold model B' (the pad). That is to say, simulation analysis in which a formed product shape having a shrinkage flange portion is provided was performed by subjecting an outer circumferential side of the quadrant shape described in FIGS. 6A and 6B to compression deformation while bending the outer circumferential side to form a flange. In addition, sheet thickness reduction rates which has occurred in the shrinkage flange portions of each of the models after forming were compared. Here, the sheet thickness reduction rate indicates a reduction rate of a sheet thickness after forming with respect to the sheet thickness before forming in the shrinkage flange portion. A maximum value of the sheet thickness reduction rate in the formed product was defined as a sheet thickness reduction rate.

Figure 7:
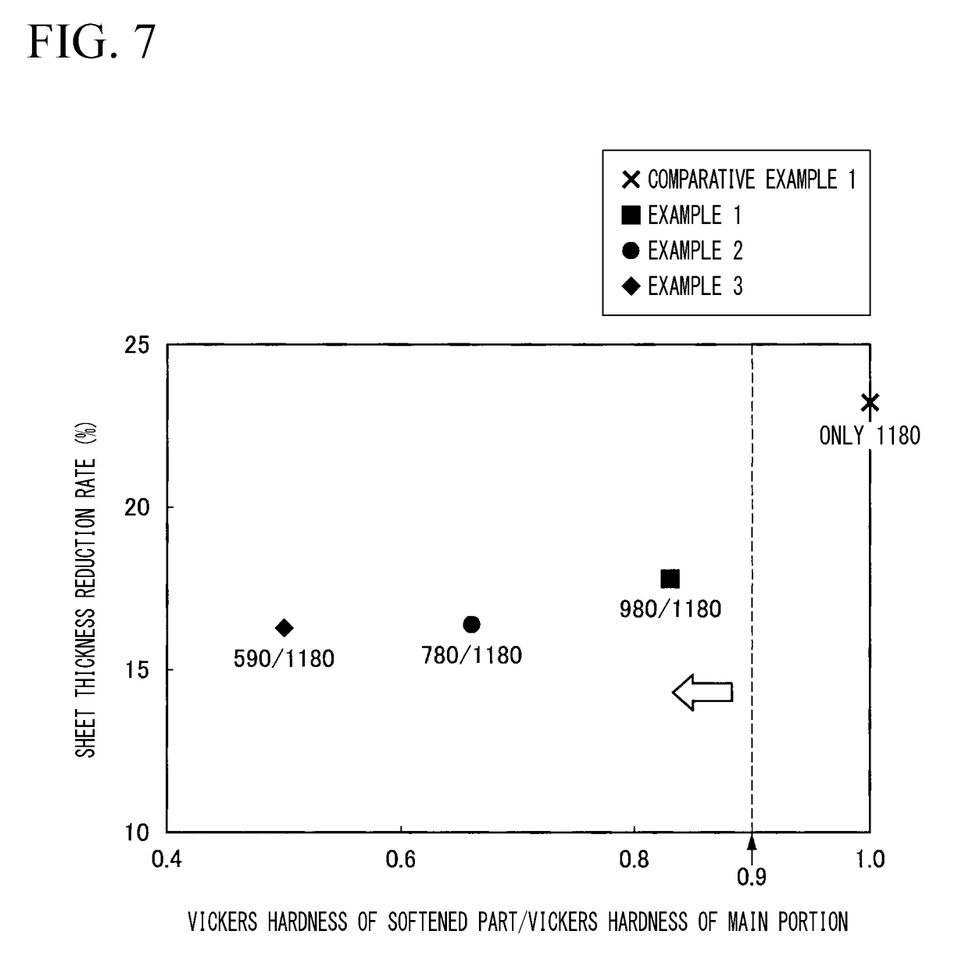
FIG. 7 is a graph showing a sheet thickness reduction rate obtained as a result of simulation analysis.

FIG. 7 is a graph showing a sheet thickness reduction rate in a shrinkage flange portion of the model after press forming which has been obtained as a result of simulation analysis. As shown in FIG. 7, sheet thickness reduction rates in Examples 1 to 3 were 16 to 18% as compared with the sheet thickness reduction rate in the comparative example. As a result, it was seen that the sheet thickness reduction rate in the shrinkage flange portion can be reduced using the blank according to any of the embodiments of the present invention. In addition, it was seen that, if the ratio of the Vickers hardness of the softened part with respect to the Vickers hardness of the main portion region was 0.9 or less, the sheet thickness reduction rate could be significantly reduced.

It was shown that the reduction of the sheet thickness reduction rate shows that the change in the sheet thickness after forming in the shrinkage flange portion is minimized, and as a result, the occurrence of wrinkles due to the change in the sheet thickness was minimized. That is to say, the blank according to any of the embodiments of the present invention was able to minimize the occurrence of wrinkles in a formed product having a shrinkage flange portion.

Also, as shown in FIG. 7, it was seen that, since the sheet thickness reduction rate does not change significantly among Examples 1 to 3, even if a Vickers hardness ratio of the softened part was reduced from 0.9, a reduction margin of the sheet thickness reduction rate did not change significantly. That is to say, it was shown that the Vickers hardness ratio of the softened part with respect to the Vickers hardness of the main portion region is preferably 0.9 or less from the viewpoint of minimizing wrinkles. Furthermore, from the viewpoint of the effect of minimizing wrinkles and the strength of components, it is preferable that a ratio of the Vickers hardness of the softened part with respect to the Vickers hardness of the main portion region be 0.4 or more.

Example 2

Figure 8:
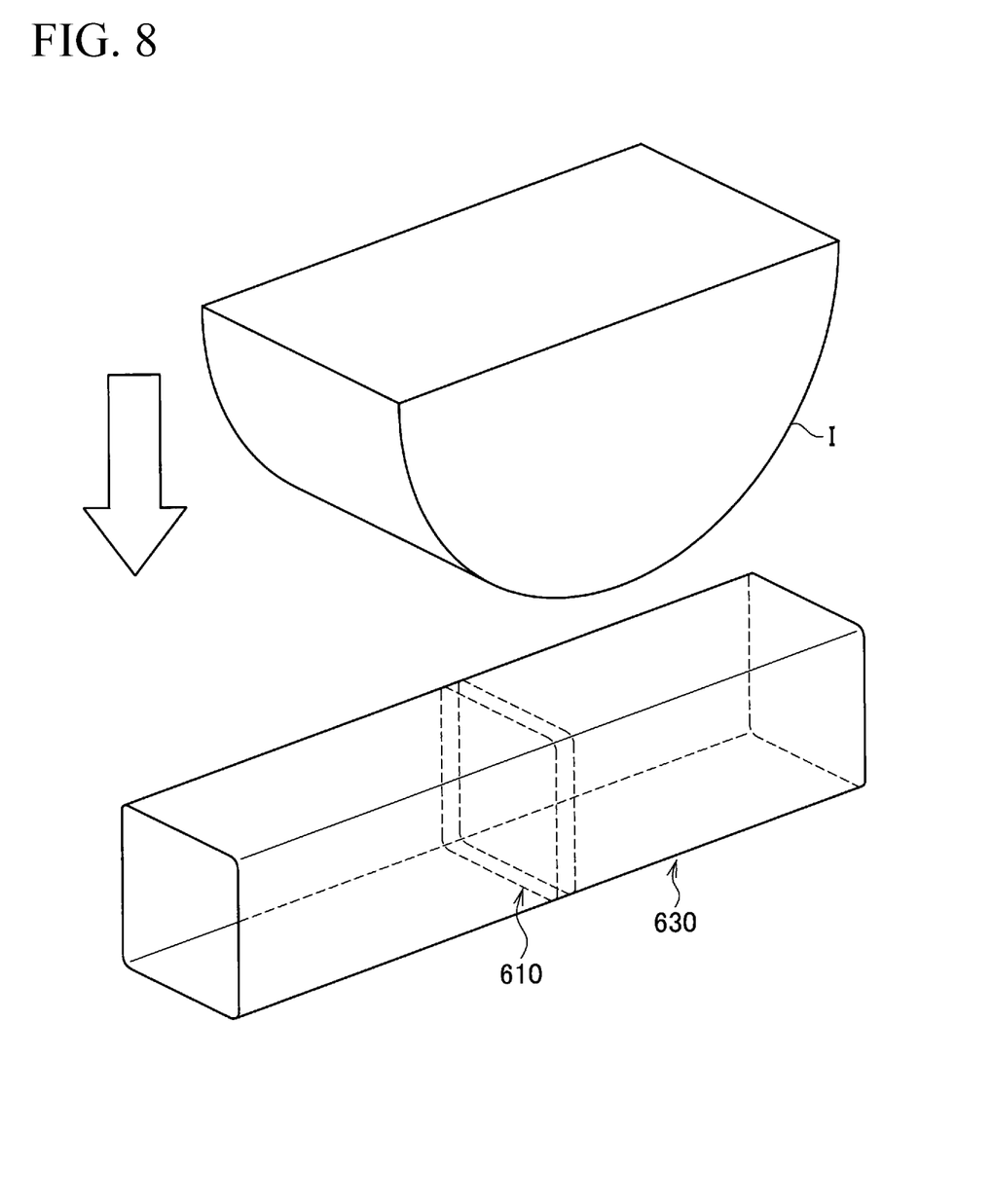
FIG. 8 is a diagram for explaining three-point bending crushing test conditions.

A three-point bending crush test was performed to evaluate the performance of the bulkhead 610 as a component according to the present invention. The test results will be described with reference to FIG. 8. FIG. 8 is a diagram for explaining the three-point bending crushing test conditions. As shown in FIG. 8, an impactor I was made to collide with the skeleton member 630 including the bulkhead 610 according to the present invention in a direction of the arrow in FIG. 8 and the presence or absence of breakage of the corner portion 615 of the bulkhead 610 was evaluated. The collision position was substantially a central position of the skeleton member 630 in a longitudinal direction which is a position in which the bulkhead 610 is provided. Furthermore, the collision speed was 64 km/h and the presence or absence of breakage when an amount of impactor I to enter the skeleton member 630 was 10 mm was examined.

In Example 4, the main portion region 617 of the bulkhead 610 was made of a steel having a tensile strength of 1180 MPa. Furthermore, the strength of the softened part 620 provided on the corner portion 615 was controlled so that the tensile strength was 980 MPa, that is, it was 0.83 of the Vickers hardness of the main portion region 617. In Comparative Example 2, the softened part is not provided on the corner portion and the entire bulkhead was made of a steel having a tensile strength of 1180 MPa. A dimension of the skeleton member 630 was an angular tubular shape of 100 mm in a vertical direction and 100 mm in a lateral direction when viewed in a cross-sectional view in a short direction and a sheet thickness was 0.8 mm. Moreover, a sheet thickness of the bulkhead was also set to 0.8 mm Table 1 shows the evaluation results.

TABLE 1

| Sample | Softened part of corner portion | Breakage of corner portion at time of entering by 10 mm |
|---|---|---|
| Comparative Example 2 | Absence | Presence |
| Example 4 | Presence | Absence |

As shown in Table 1, in Comparative Example 2 in which the softened part was not provided on the corner portion, breakage occurred in the corner portion of the bulkhead when the impactor I entered by 10 mm. On the other hand, in Example 4, the bulkhead 610 did not break even when the impactor I entered by 10 mm. In this way, it was shown that, when the softened part 620 softened more than the main portion region 617 is provided in the corner portion 615 and the strength of the softened part 620 is set to 0.9 or less of the Vickers hardness of the main portion region 617, the breakage at the corner portion 615 of the bulkhead 610 could be minimized.

Although the preferred embodiments of the present invention have been described in detail above with reference to the accompanying drawings, the present invention is not limited to such examples. It is clear that a person having ordinary knowledge in the field of technology to which the present invention belongs can come up with various changed examples or modified examples within the scope of the technical idea described in the claims and it is naturally understood that these also belong to the technical scope of the present invention.

INDUSTRIAL APPLICABILITY

The present invention is industrially useful because the present invention can provide a blank capable of minimizing an influence of wrinkles occurring on a shrinkage flange portion or the like.

BRIEF DESCRIPTION OF THE REFERENCE SYMBOLS 100, 300 Blank
110, 310 Main portion region
111, 311 Outer edge
113, 313 Protruding region
120, 320 Softened part
200 Formed product
210 Web portion
220 Flange portion
221, 421 Shrinkage flange portion
400 Seat cushion frame
610 Bulkhead (component)
611 Web portion (bottom surface portion)
613 Flange portion
613a First flange portion (first vertical wall portion)
613b Second flange portion (second vertical wall portion)
615 Corner portion (shrinkage flange portion)
617 Main portion region
620 Softened part

The invention claimed is:

1. A blank made of a steel and comprising at least two protruding regions having an outer edge protruding outward in in-plane directions,
   wherein a softened part is formed at least partially in the protruding regions and the softened part is formed in at least a part of the outer edge of the protruding regions,
   a Vickers hardness of the softened part is lower than a Vickers hardness of a main portion region, and
   the blank comprises at least two of the protruding regions having the softened part,
   wherein a tensile strength of the main portion region of the blank is 1100 MPa or more, and
   wherein a tensile strength of the softened part is 1000 MPa or less.

2. The blank according to claim 1, wherein, in the protruding region having the softened part formed therein,
   a radius of curvature R of an outer edge of the protruding region is 150 mm or less, and
   an opening angle of the outer edge is 120° or less.

3. The blank according to claim 1, wherein a ratio of the Vickers hardness of the softened part to the Vickers hardness of the main portion region of the blank is 0.4 or more and 0.9 or less.

4. A component made of a steel and comprising:
   a bottom surface portion;
   a first vertical wall portion and a second vertical wall portion which stand upright from an end portion of the bottom surface portion; and
   at least two corner portions provided between the first vertical wall portion and the second vertical wall portion,
   wherein a softened part is formed at least partially in the corner portion,
   a Vickers hardness of the softened part is lower than a Vickers hardness of a main portion region of the component, and
   the component comprises at least two of the corner portions having the softened part,
   wherein a tensile strength of the main portion region of the component is 1100 MPa or more, and
   wherein a tensile strength of the softened part is 1000 MPa or less.

5. The component according to claim 4, wherein a ratio of the Vickers hardness of the softened part to the Vickers hardness of the component is 0.4 or more and 0.9 or less.

6. The component according to claim 4, wherein the corner portion includes a shrinkage flange portion.

* * * * *